United States Patent
Lee et al.

(10) Patent No.: US 12,019,089 B2
(45) Date of Patent: Jun. 25, 2024

(54) MOVING OBJECT SENSING SYSTEM AND METHOD BASED ON MOTION PROPENSITY

(71) Applicant: HYUNDAI MOBIS CO., LTD., Seoul (KR)

(72) Inventors: Tae Yun Lee, Anyang-si (KR); Tae Yoon Son, Anyang-si (KR); Jin Gyu Jang, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 61 days.

(21) Appl. No.: 17/561,199

(22) Filed: Dec. 23, 2021

(65) Prior Publication Data

US 2023/0111640 A1    Apr. 13, 2023

(30) Foreign Application Priority Data

Oct. 7, 2021  (KR) .................. 10-2021-0133488

(51) Int. Cl.
*G01P 13/00* (2006.01)
*G08B 21/18* (2006.01)

(52) U.S. Cl.
CPC .............. *G01P 13/00* (2013.01); *G08B 21/18* (2013.01)

(58) Field of Classification Search
CPC ................................ G01P 13/00; G08B 21/18
USPC .......................................................... 73/493
See application file for complete search history.

(56) References Cited

U.S. PATENT DOCUMENTS

| | | | |
|---|---|---|---|
| 6,753,780 B2 | 6/2004 | Li | |
| 8,917,906 B2 * | 12/2014 | Lee | G06V 10/449 |
| | | | 382/103 |
| 9,928,707 B2 * | 3/2018 | Naylor | G08B 13/19606 |
| 2018/0124342 A1 * | 5/2018 | Uyeno | H04N 3/10 |
| 2020/0180472 A1 * | 6/2020 | Lu-Dac | B60N 2/26 |

FOREIGN PATENT DOCUMENTS

| | | | |
|---|---|---|---|
| JP | 2008-273433 A | 11/2008 | |
| JP | 2017181225 A | 10/2017 | |
| KR | 10-2011-0014404 A | 2/2011 | |
| KR | 10-1568090 B1 | 11/2015 | |
| KR | 102108326 B1 | 5/2020 | |
| KR | 10-2020-0072897 A | 6/2020 | |
| KR | 102151195 B1 | 10/2020 | |
| KR | 2021-0037792 A | 4/2021 | |
| WO | WO-2006058098 A2 * | 6/2006 | ......... B60R 25/1004 |

OTHER PUBLICATIONS

English translation for KR-102108326-B1 (Year: 2020).*
Office Action dated Apr. 10, 2023 in corresponding Korean patent application No. 10-2021-0133488.
Notice of Allowance dated Oct. 10, 2023 in corresponding Korean patent application No. 10-2021-0133488.

* cited by examiner

*Primary Examiner* — Alesa Allgood
*Assistant Examiner* — Byung Ro Lee
(74) *Attorney, Agent, or Firm* — NovoTechIP International PLLC

(57) ABSTRACT

The present invention relates to a moving object sensing system and method based on motion propensity, which determine the of randomness based on an internal object motion propensity of a vehicle by using various sensors installed in the vehicle and quickly and accurately check and sense a separate external object through comparison with a reference randomness like luggage or a person.

12 Claims, 2 Drawing Sheets

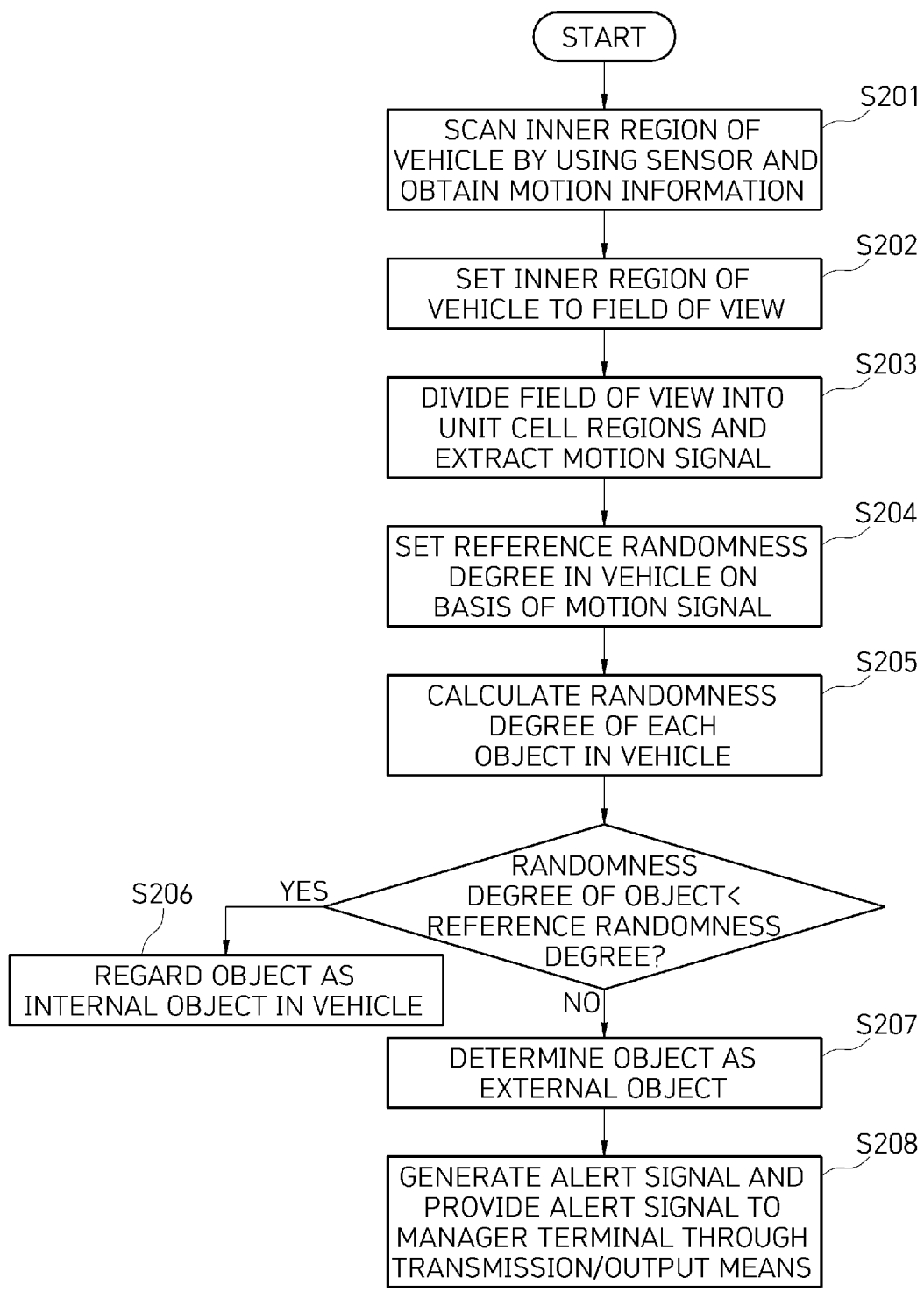

MOVING OBJECT SENSING SYSTEM AND METHOD BASED ON MOTION PROPENSITY

CROSS-REFERENCE TO RELATED APPLICATIONS

This application claims priority under 35 U.S.C. § 119 to Korean Patent Application No. 10-2021-0133488, filed on Oct. 7, 2021, the disclosure of which is incorporated herein by reference in its entirety.

BACKGROUND OF THE INVENTION

1. Field of the Invention

The present invention relates to a fluid or moving object sensing system and method based on motion propensity, and more particularly, to a fluid sensing system and method based on motion propensity, which determine a randomness or entropy based on an internal object motion propensity of a vehicle by using various sensors installed in the vehicle and quickly and accurately check and sense a separate external object through comparison with a reference randomness like luggage or a person.

2. Discussion of Related Art

Generally, when a driver deviates from a driver seat in a state where there is a person or an animal moving in a vehicle, it is required to alert the driver to that there is an animal or person sensed in the vehicle. Particularly, because a safety accident of an infant may occur when a driver deviates from a vehicle in a state where the infant is in the vehicle, it is required to provide the driver with information about the infant remaining in the vehicle by applying a rear occupant alert (ROA) system.

To this end, technology for sensing the presence of an occupant in a rear seat of a vehicle to inform a driver of a sensing result is being developed recently. However, an ROA system of the related art primarily senses only a distance from a sensing device to an occupant, and due to this, has a problem where it is difficult to detect an accurate position of a rear occupant and it is difficult to determine whether an object located in a rear seat is a thing or an occupant.

BRIEF SUMMARY OF THE INVENTION

Accordingly, the present invention provides a moving object sensing system and method based on motion propensity, which determine a randomness or entropy based on an internal object motion propensity of a vehicle by using various sensors installed in the vehicle and quickly and accurately check and sense a separate external object through comparison with a reference randomness like luggage or a person.

In one general aspect, a moving object sensing system based on motion propensity includes: a sensor installed for determining a motion propensity in a vehicle; a motion signal extractor configured to set a field of view of an inner region of the vehicle, divide the field of view into a plurality of unit cell regions, and extract a motion signal secured through the sensor for each of the plurality of unit cells; and an external object determiner configured to set a reference randomness based on the extracted motion signal, calculate a randomness of a corresponding object when the corresponding object moving in the vehicle is sensed by the sensor, and determine the corresponding object as an external object when the calculated randomness is greater than the reference randomness.

In an embodiment, the sensor may include a radar device, a camera device, and a motion sensor.

In an embodiment, the motion signal extractor may measure strength of the motion signal secured through the sensor in a corresponding unit cell and transfers the measured strength of the motion signal to the external object determiner, and the external object determiner may extract a pattern of a strength variation of the motion signal and may set the reference randomness based on the extracted pattern.

In an embodiment, the external object determiner may set the reference randomness based on a pattern of a strength variation of a motion signal for each object which generates a motion signal in the vehicle based on a horizontal-direction and vertical-direction motion of the vehicle.

In an embodiment, when a specific unit cell for determining a motion propensity is selected by a manager terminal, the motion signal extractor may extract a motion signal corresponding to the selected specific unit cell.

In an embodiment, the external object determiner may generate an alert signal corresponding to the determined external object and may transmit the generated alert signal to a manager terminal.

In another general aspect, a moving object sensing system based on motion propensity include: a sensor installed for determining a motion propensity in a vehicle; a motion signal extractor configured to set a field of view of an inner region of the vehicle, divide the field of view into a plurality of unit cell regions, extract a motion signal secured through the sensor for each of the plurality of unit cells, set a unit cell region where a movement of an object having a largest frequency number for a predetermined time is located, and preferentially extracts a motion signal corresponding to a corresponding unit cell region; and an external object determiner configured to set a reference randomness based on the motion signal preferentially extracted through the motion signal extractor, calculate a randomness of a corresponding object when the corresponding object moving in the corresponding unit cell region is sensed by the sensor, and determine the corresponding object as an external object when the calculated randomness is greater than the reference randomness.

In an embodiment, the sensor may include a vehicle vibration sensor, a radar device, a camera device, a motion sensor, and an infrared sensor.

In an embodiment, the motion signal extractor may measure strength of the motion signal secured through the sensor in a corresponding unit cell and may transfer the measured strength of the motion signal to the external object determiner, and the external object determiner may extract a pattern of a strength variation of the motion signal and may set the reference randomness based on the extracted pattern.

In an embodiment, the external object determiner may set the reference randomness based on a pattern of a strength variation of a motion signal for each object which generates a motion signal in the vehicle based on a horizontal-direction and vertical-direction motion of the vehicle, and the external object determiner may regard an object, providing a corresponding motion signal while moving in a direction corresponding to a horizontal motion direction or a vertical motion direction of the vehicle secured through the vehicle vibration sensor, as an internal object.

In an embodiment, when a specific unit cell for determining a motion propensity is selected by a manager terminal, the motion signal extractor may extract a motion signal corresponding to the selected specific unit cell.

In another general aspect, a moving object sensing method based on motion propensity includes: scanning an inner region of a vehicle by using a sensor installed in the vehicle; setting, by a motion signal extractor, a field of view of an inner region of the vehicle, dividing the field of view into a plurality of unit cell regions, and extracting a motion signal secured through the sensor for each of the plurality of unit cells; and setting, by an external object determiner, a reference randomness based on the extracted motion signal, calculating a randomness of a corresponding object when the corresponding object moving in the vehicle is sensed by the sensor, and determining the corresponding object as an external object when the calculated randomness is greater than the reference randomness.

In an embodiment, the extracting of the motion signal may include measuring, by the motion signal extractor, strength of the motion signal secured through the sensor in a corresponding unit cell and transferring the measured strength of the motion signal to the external object determiner, and the determining of the corresponding object as the external object may include extracting, by the external object determiner, a pattern of a strength variation of the motion signal and setting a reference randomness based on the extracted pattern.

In an embodiment, the determining of the corresponding object as the external object may further include setting, by the external object determiner, the reference randomness based on a pattern of a strength variation of a motion signal for each object which generates a motion signal in the vehicle based on a horizontal-direction and vertical-direction motion of the vehicle.

In an embodiment, the determining of the corresponding object as the external object may further include generating, by the external object determiner, an alert signal corresponding to the determined external object and transmitting the generated alert signal to a manager terminal.

Other features and aspects will be apparent from the following detailed description, the drawings, and the claims.

BRIEF DESCRIPTION OF THE DRAWINGS

FIG. 2 is a diagram illustrating in sequence a series of processes of sensing an internal moving object of a vehicle by using the moving object sensing system 100 based on motion propensity illustrated in FIG. 1.

DETAILED DESCRIPTION OF THE INVENTION

Figure 1:
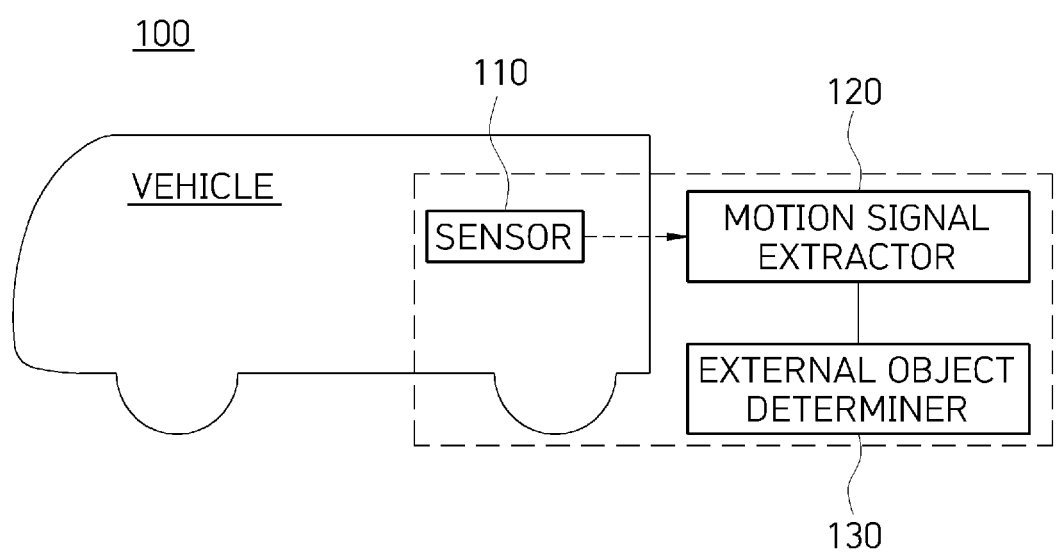
FIG. 1 is a diagram illustrating a configuration of a moving object sensing system 100 based on motion propensity according to an embodiment of the present invention.

Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention.

It will be understood that although the terms including an ordinary number such as first or second are used herein to describe various elements, these elements should not be limited by these terms. These terms are only used to distinguish one element from another element.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components. Like reference numerals refer to like elements throughout.

FIG. 1 is a diagram illustrating a configuration of a moving object sensing system 100 based on motion propensity according to an embodiment of the present invention.

Referring to FIG. 1, the moving object sensing system 100 based on motion propensity according to an embodiment of the present invention may include a sensor 110, a motion signal extractor 120, and an external object determiner 130.

First, the sensor 110 may be installed in a vehicle and may collect information for determining a motion propensity of an internal object of the vehicle. The sensor 110 may include a radar device, a camera device, and a motion sensor. Also, the sensor 110 may further include a vehicle vibration sensor, a motion sensor, and an infrared sensor.

Therefore, the sensor 110 may collect all of information for determining a motion propensity of an object previously installed in the vehicle and information for determining a motion propensity of an external object like luggage or an occupant. The sensor 110 may be installed in a direction toward a rear occupant of the vehicle where a field of view of a driver is not secured, and the kind thereof is not limited.

The motion signal extractor 120 may set a field of view of an inner region of the vehicle, secured through the sensor 110, divide the field of view into a plurality of unit cell regions, and extract a motion signal secured through the sensor 110 for each unit cell.

In more detail, when a field of view corresponding to a rear occupant is secured through a camera device, a corresponding region may be relatively wide, and due to this, it may be difficult to precisely check a detailed motion of each object. Therefore, the motion signal extractor 120 may divide a correspond field of view into a plurality of virtual unit cell regions, set a position of an object located in each of the unit cell regions, and extract a motion signal of a corresponding object. Accordingly, comparing with an operation of determining a motion of a whole field of view, a motion signal may be more precisely and quickly extracted. The extracted motion signal may be transferred to the external object determiner 130.

In an embodiment, the motion signal extractor 120 may measure the strength of a motion signal of each object secured through the sensor 110 for each unit cell and may transfer strength information and the motion signal of each object measured to the external object determiner 130.

Moreover, in an embodiment, when a specific unit cell for determining a motion propensity in a whole field of view is selected by a manager terminal, the motion signal extractor 120 may preferentially and restrictively extract a motion signal in the selected unit cell.

The external object determiner 130 may determine an object having uniform strength based on a motion signal of each object transferred from the motion signal extractor 120 and may set a reference randomness based on a determination result. In this case, when a motion in a field of view has a uniform propensity, the external object determiner 130 may determine that the randomness is low, and when the motion in the field of view has a non-uniform propensity, the external object determiner 130 may determine that the randomness is high. When there is no object in a vehicle, a motion signal in the vehicle may be hardly, and thus, the external object determiner 130 may assign an offset to a corresponding state (numerical value) to set a reference randomness.

For example, when there is an object moving in a vehicle, the external object determiner 130 may calculate a randomness of the object, and when the randomness of the object is greater than the reference randomness, the external object determiner 130 may determine the object as an external object (for example, luggage or an occupant).

In an embodiment, the external object determiner 130 may check a pattern of strength variations of motion signals of all objects generating a motion signal in the vehicle based on a horizontal-direction and vertical-direction motion of the vehicle and may set the reference randomness based on the determined pattern. Accordingly, by using a vehicle vibration sensor included in the sensor 110, the external object determiner 130 may check a motion signal based on the horizontal-direction and vertical-direction motion of the vehicle and the pattern of strength variations of motion signals of all objects.

In this case, the external object determiner 130 may regard an object, providing a motion signal corresponding to a horizontal motion direction and a vertical motion direction of a vehicle, as an object (for example, a handle, a curtain, or the like) previously located in the vehicle, but otherwise, the external object determiner 130 may regard an object, providing a motion signal which does not correspond to the horizontal motion direction and the vertical motion direction of the vehicle, as an external object.

Moreover, in an embodiment, the external object determiner 130 may generate an alert signal corresponding to the determined external object and may transmit the alert signal to a manager terminal or may provide the alert signal to a driver through an output means installed in a driver seat of the vehicle.

Hereinafter, a method of sensing an in-vehicle fluid by using the moving object sensing system 100 based on a motion propensity described above with reference to FIG. 2 will be described.

FIG. 2 is a diagram illustrating in sequence a series of processes of sensing an internal moving object of a vehicle by using the moving object sensing system 100 based on motion propensity illustrated in FIG. 1.

Referring to FIG. 2, a sensor installed in the vehicle may first scan the inside of a vehicle to obtain information for determining a motion propensity of each object in the vehicle in step S201, and the motion signal extractor may set a field of view of an inner region of the vehicle based on the information obtained through the sensor in step S202. In step S203, the motion signal extractor may divide the field of view into a plurality of unit cell regions, extract a motion signal secured through the sensor for each unit cell, and transmit the motion signal to the external object determiner.

The external object determiner may set a reference randomness in the vehicle based on the extracted motion signal in step S204, and when an object moving in the vehicle is sensed through the sensor, the external object determiner may calculate a randomness of a corresponding object in step S205. For example, when the calculated randomness is not greater than the reference randomness, the external object determiner may regard the corresponding object as an internal object previously located in the vehicle in step S206. For example, when the calculated randomness is greater than the reference randomness, the external object determiner may determine the corresponding object as the internal object like luggage or a person in step S207, and then, may generate an alert signal based thereon and may transmit the alert signal to a manager terminal or may provide the alert signal to a driver through an output means installed in a driver seat in step S208.

According to the embodiments of the present invention, the moving object sensing system and method may determine the randomness based on an internal object motion propensity of a vehicle by using various sensors installed in the vehicle and may quickly and accurately check and sense a separate external object through comparison with a reference randomness like luggage or a person, thereby preventing an accident of a neglected occupant and providing a quick aid when an emergency situation occurs.

Particularly, according to the embodiments of the present invention, a method based on the randomness may be good in robustness to disturbance compared to the related art and may remove the disturbance.

Moreover, unlike things, living things have a biological signal generally, and because things do not have a will, an external impact is applied to things as-is. On the other hand, living things have a will for responding to an external impact, and thus, this may be reflected in the randomness as-is. Accordingly, based on such a feature, the present invention may be used for accurately differentiating an internal thing of a vehicle from an internal living thing of the vehicle.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A moving object sensing system based on a motion propensity, comprising:
    a sensor configured to determine a motion propensity of an object within a vehicle, the sensor having a field of view of an inner region of the vehicle;
    a motion signal extractor configured to divide the field of view into a plurality of unit cell regions, and extract a motion signal secured through the sensor for each of the plurality of unit cells; and
    an external object determiner configured to set a reference randomness based on motion signals extracted when no external objects are inside the vehicle, calculate a randomness of each motion signal when a movement of the corresponding object within the vehicle is sensed by the sensor, and determine the corresponding object as an external object when the calculated randomness exceeds the reference randomness,
    wherein, to set the reference randomness:
        the motion signal extractor is configured to measure a strength of the motion signal secured through the sensor in each unit cell and transfer the measured strength of the motion signal in each unit cell to the external object determiner, and
        the external object determiner is configured to extract a pattern of a strength variation of the motion signal and set the reference randomness based on the extracted pattern.

2. The moving object sensing system of claim 1, wherein the sensor comprises a radar device, a camera device, and a motion sensor.

3. The moving object sensing system of claim 1, wherein the external object determiner is further configured to set the reference randomness based on a pattern of a strength variation of the motion signal for each object which generates the motion signal in the vehicle based on a horizontal-direction and vertical-direction motion of the vehicle.

4. The moving object sensing system of claim 1, wherein, when a specific unit cell for determining the motion propensity is selected by a manager terminal, the motion signal extractor extracts the motion signal corresponding to the selected specific unit cell.

5. The moving object sensing system of claim 1, wherein the external object determiner is further configured to generate an alert signal corresponding to the determined external object and transmit the generated alert signal to a manager terminal.

6. A moving object sensing system based on a motion propensity, comprising:
    a sensor configured to determine a motion propensity of an object within a vehicle;
    a motion signal extractor configured to set a field of view of an inner region of the vehicle, divide the field of view into a plurality of unit cell regions, extract a motion signal secured through the sensor for each of the plurality of unit cells, set a unit cell region where a moment of an object having a largest frequency for a predetermined time is located, and preferentially extracts the motion signal corresponding to a corresponding unit cell region; and
    an external object determiner configured to set a reference randomness based on a previous motion signal extracted when no external objects are inside the vehicle, and to calculate a randomness of the object corresponding to the motion signal when the corresponding object moving in the corresponding unit cell region is sensed by the sensor, and determine the corresponding object as an external object when the calculated randomness exceeds the reference randomness,
    wherein, to set the reference randomness:
        the motion signal extractor is configured to measure a strength of the motion signal secured through the sensor in each unit cell and transfer the measured strength of the motion signal in each unit cell to the external object determiner, and
        the external object determiner is configured to extract a pattern of a strength variation of the motion signal and set the reference randomness based on the extracted pattern.

7. The moving object sensing system of claim 6, wherein the sensor comprises a vehicle vibration sensor, a radar device, a camera device, a motion sensor, and an infrared sensor.

8. The moving object sensing system of claim 7, wherein:
    the external object determiner is further configured to set the reference randomness based on a pattern of a strength variation of the motion signal for each object which generates the motion signal in the vehicle based on a horizontal-direction and vertical-direction motion of the vehicle, and
    the external object determiner is further configured to regard the object, which provides the corresponding motion signal while moving in a direction corresponding to the horizontal-direction or vertical-direction motion of the vehicle secured through the vehicle vibration sensor, as an internal object.

9. The moving object sensing system of claim 6, wherein, when a specific unit cell for determining a motion propensity is selected by a manager terminal, the motion signal extractor is configured to extract the motion signal corresponding to the selected specific unit cell.

10. A moving object sensing method based on a motion propensity, comprising:
    scanning, using a sensor, an inner region of a vehicle;
    setting a field of view of an inner region of the vehicle;
    dividing the field of view into a plurality of unit cell regions;
    extracting a motion signal secured through the sensor for each of the plurality of unit cells;
    setting a reference randomness based on the extracted motion signal generated when no external objects are inside the vehicle;
    calculating a randomness of an object corresponding to the motion signal when the object moves in the vehicle is sensed by the sensor; and
    determining the object as an external object when the calculated randomness exceeds the reference randomness,
    wherein, to set the reference randomness:
        the motion signal extractor is configured to measure a strength of the motion signal secured through the sensor in each unit cell and transfer the measured strength of the motion signal in each unit cell to the external object determiner, and
        the external object determiner is configured to extract a pattern of a strength variation of the motion signal and set the reference randomness based on the extracted pattern.

11. The moving object sensing method of claim 10, wherein determining the object as the external object further comprises setting the reference randomness based on the pattern of the strength variation of the motion signal for each object which generates the motion signal in the vehicle based on a horizontal-direction and vertical-direction motion of the vehicle.

12. The moving object sensing method of claim 10, wherein determining the object as the external object further comprises generating an alert signal corresponding to the determined external object and transmitting the generated alert signal to a manager terminal.

* * * * *